W. S. PIGGINS.
CONCRETE CONSTRUCTION.
APPLICATION FILED JAN. 30, 1919.
1,380,324.
Patented May 31, 1921.
3 SHEETS—SHEET 1.
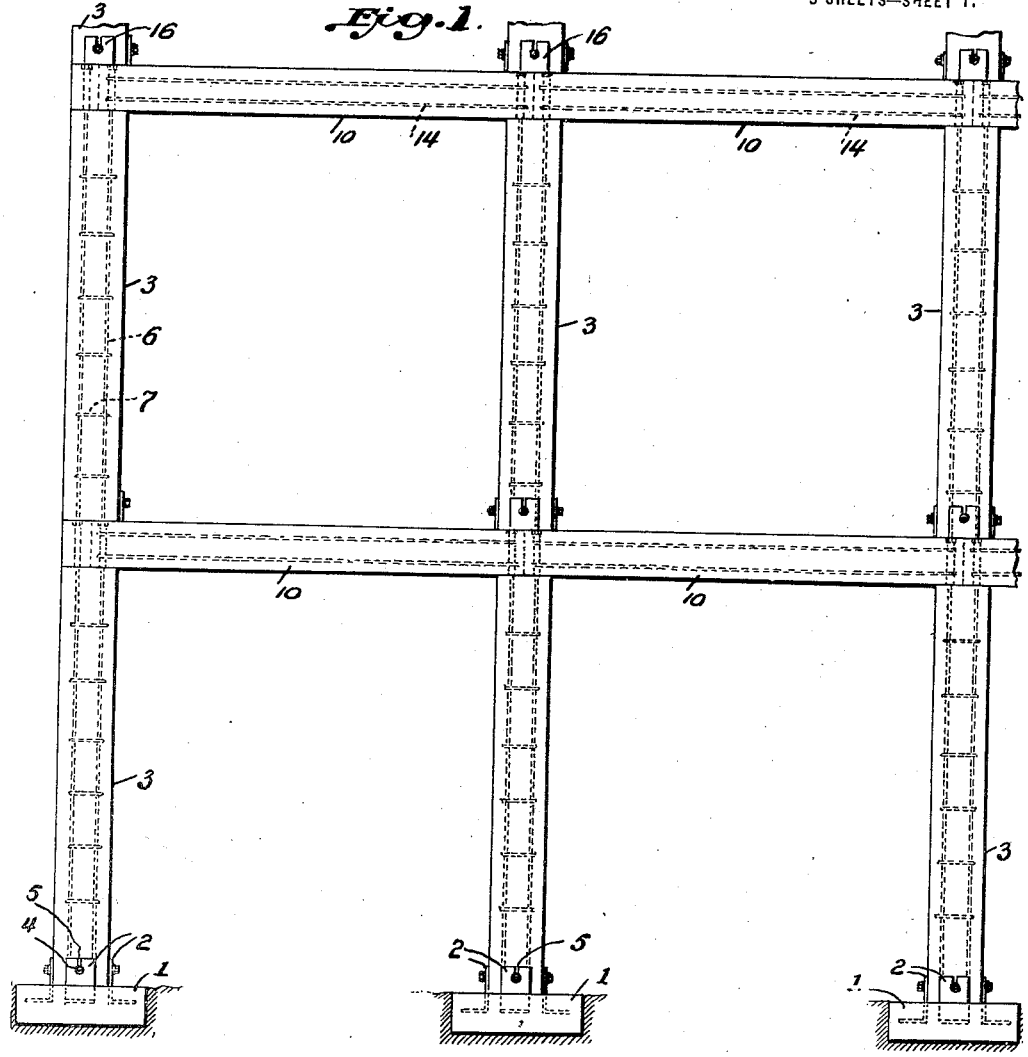

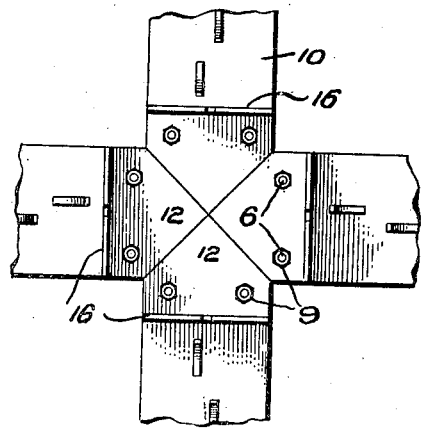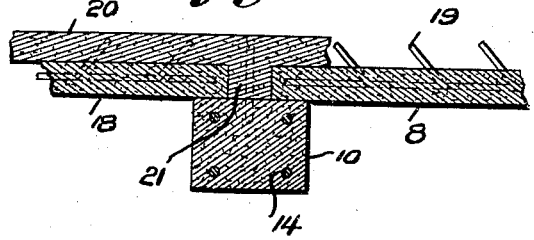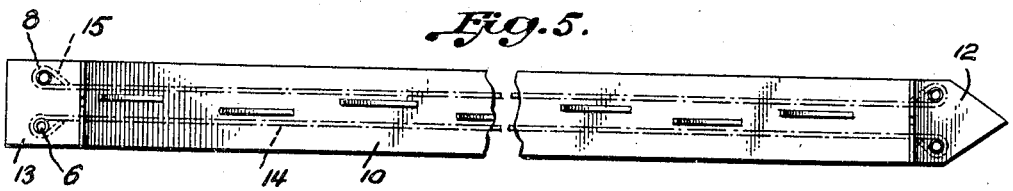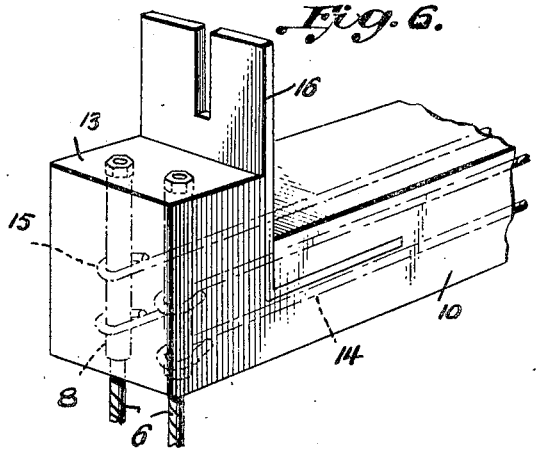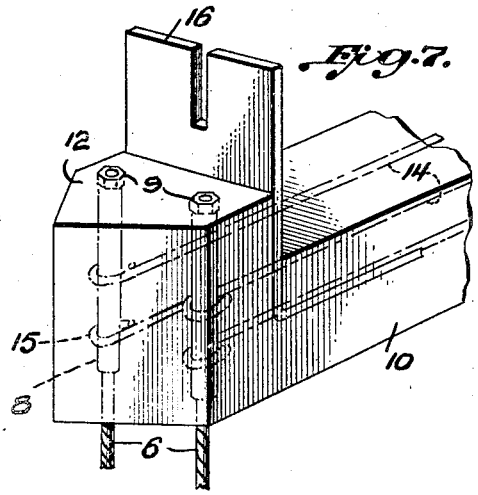

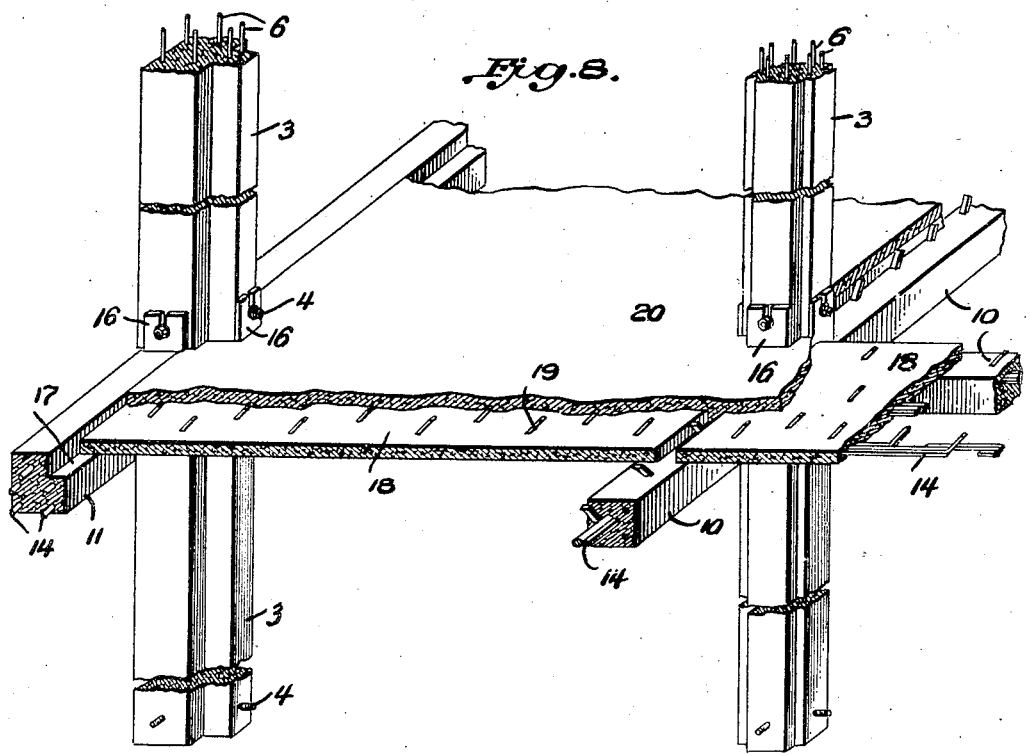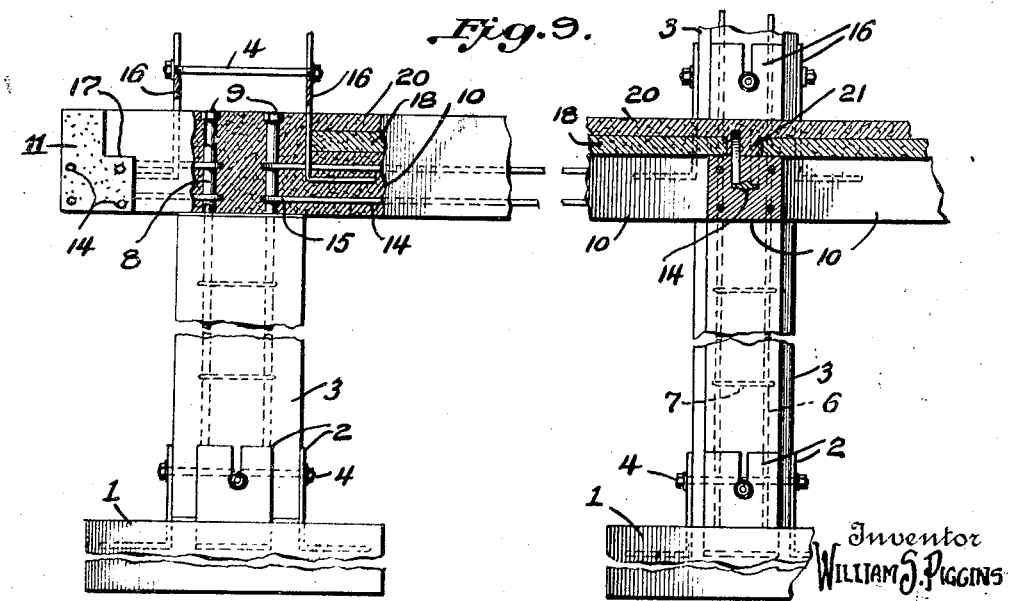

UNITED STATES PATENT OFFICE.

WILLIAM S. PIGGINS, OF DETROIT, MICHIGAN.

CONCRETE CONSTRUCTION.

1,380,324.   Specification of Letters Patent.   Patented May 31, 1921.

Application filed January 30, 1919. Serial No. 273,955.

*To all whom it may concern:*

Be it known that I, WILLIAM S. PIGGINS, a citizen of the United States of America, residing at Detroit, in the county of Wayne and State of Michigan, have invented certain new and useful Improvements in Concrete Constructions, of which the following is a specification, reference being had therein to the accompanying drawings.

This invention relates to concrete construction and particularly to a unit system by which the structural elements or members, such as columns, beams, girders, lintels, slabs and other building parts are separately produced at a suitable factory or site, carried to the building site, and assembled in a manner similar to structural steel, such system being in contradistinction to monolithic forms produced by pouring concrete at a building site or as a building progresses. This present method of concrete construction necessitates various kinds of forms and material and labor incident thereto; slow progress on account of inclement weather and the time required for the concrete to set and become seasoned, and, the retarding of other work about such a building under construction due to the accumulation of materials and also a shortage of material due to limited storing space. It is a fact that small blocks and other forms have been made away from a building site and then hauled to said site and a small building fabricated, but never a tall building or large structure due to the fact that it is impossible to tie and bind small building material to provide a rigid and safe large structure.

With my unit or pre-cast system, it is possible to expeditiously and economically construct a large building similar to assembling structural steel and obtain practically the same degree of rigidity or safety factor equal to that provided by structural steel. The system permits of structural members being fabricated at a plant where the structural members may be properly reinforced by metallic rods, fabric and other devices; uniformity insured as to sizes; perfect seasoning or curing obtained, and more elaborate structural members produced than what could be made at a building site or during the construction of a building. The use of temporary forms, material and labor incident thereto are completely eliminated, since the structural shapes and sizes are such as to permit of permanent molds being provided for immediate use.

My unit or pre-cast system also includes the binding or tying together of girders, beams and pre-cast slabs entering into a floor or wall construction into a homogeneous mass which will add rigidity to the finished structure and at the same time permit of a mosaic finish being obtained for floor or wall surfaces.

My invention possesses many other advantages that will be apparent to those skilled in concrete work, and as illustrating the preferred embodiments of my construction, reference will be had to the drawings, wherein—

Figure 1 is a side elevation of a portion of a structure in accordance with my unit system construction;

Fig. 2 is a perspective view showing the manner of uniting beams with columns;

Fig. 3 is a plan of the same showing the beams provided with anchoring members;

Fig. 4 is a cross sectional view of a beam supporting additional beams for pre-cast floor slabs with a finished floor thereon;

Fig. 5 is a plan of a floor beam;

Figs. 6 and 7 are perspective views of the ends of beams;

Fig. 8 is a perspective view of the floor construction; and

Fig. 9 is a side elevation of the same, partly broken away and partly in section.

In describing my invention by aid of the views above referred to, I desire to point out that the same are intended as merely illustrative of structural members by which my unit system of construction may be put into practice, therefore I do not care to confine my invention to the precise members and arrangement thereof shown. The following description is to be broadly construed as including such substitute construction and arrangement of parts which are the obvious equivalent of those to be hereinafter referred to.

Considering Fig. 1 showing a portion of a building framework 1 denotes footings that may be cast or molded on the building site or when used for small buildings at a special factory for producing the same. These footings may be suitably anchored and reinforced, but mounted in said footings are a plurality of angle plates by which columns or uprights 3 are connected to the footings. The angle plates in the footings are positioned so as to form a somewhat rectangular inclosure or socket for the lower ends of the columns 3, said columns having the lower ends thereof provided with transverse stud bolts or connecting members 4 adapted to extend through slots 5 in the plates 2 and be held by heads and nuts on the said bolts. The bolts 4 may extend all the way through the lower ends of the columns or be simply anchored therein so that after the columns are properly positioned between the angle plates 2, said columns may be connected thereto and become a part thereof.

The columns 3 may be rectangular in cross section and reinforced by longitudinal and transverse members 6 and 7. The reinforcing members 6 and 7 may be in the form of twisted or straight rods, tie wires, expanded metal or any well known form of metallic reinforcement. As shown in Fig. 9, a longitudinal reinforcement member 6 may be placed in pipes, ferrules or sleeves 8 and the ends of the members 6 screw-threaded so as to receive nuts 9. The sleeves or ferrules 8 are particularly useful when other reinforcing members are articulated with the reinforcing members of the columns 3.

As shown in Figs. 2 and 3 it is possible to construct the columns with recessed vertical edges or corners and as a matter of fact the columns may be made of any desired cross sectional shape. The upper ends of the columns 3 are adapted to support, beams, some of which have been designated 10 and others 11. The beams 10 may have the ends thereof provided with rectangular or substantially triangular shaped heads 12 and 13, the heads 12 permitting of a plurality of the beams 10 joining each other on top of a column with the metallic reinforcements of the column extending through the heads and anchored relative thereto. The heads 13 permit of the beams 10 being firmly set on such columns forming part of an outer wall or even an intermediate column as shown in Fig. 1. The beams 10 may be provided with longitudinal metallic reinforcing members 14 and the ends of said members looped or provided with eyes 15 so that the longitudinal members 6 of the columns 3 may extend therethrough and thus tie the beams 10 to the columns 3 by metallic means in addition to cement or other material used for binding joints of the structural members.

The ends of the beams 10 and 11 are provided with angle plates 16, similar to the angle plates 2, said angle plates 16 having the horizontal portions or flanges thereof embedded in the beams and the vertical flanges or portions thereof extending upwardly at the outer sides of the heads 12 and 13 to form an inclosure for the lower end of another column that may be seated on the heads 12 and 13 and connected to the angle plates 16.

The beams 10 and 11 may be used as floor supporting beams or girders and the beams 11 differ from the beams 10 in having longitudinal seats 17 for floor slabs 18 that are pre-cast. It is preferable to use the beams 11 at the side walls of a building and use the beams 10 intermediate the walls thereof, so that the confronting edges of the floor slabs 18 may rest on the beams 10 and be anchored relative thereto. These intermediate floor beams, as well as the floor slabs 18, may have the metallic reinforcements thereof protruding from the upper surfaces of the beams and slabs, as indicated at 19, and a finishing floor 20 may be laid on the floor slabs so as to bind all said slabs together as a homogeneous mass, with the finishing floor extending between the confronting edges of the floor slab onto the intermediate floor beams, as clearly shown in Fig. 4. The depending portions of the finished floor have been designated 21 and when the finished floor is laid by pouring or the use of cementitious material, then the entire floor area of a building may become a homogeneous mass relative to the beams and the heads thereof, as best shown in Figs. 8 and 9.

I attach considerable importance to the floor construction since the floor slabs may be pre-cast and expeditiously placed in position, in contradistinction to ordinary hollow tile floors which require scantling and forms until such floors have set.

So far there has been described the main essential members of a building that will enter into the skeleton framework thereof, similar to the skeleton structural steel framework of an ordinary building, and it is now obvious that other structural members, as lintels, sills, frames, cornices and interlocking parts may be made away from a building site, hauled thereto, and expeditiously and economically fabricated to provide a building framework that will sustain considerable weight and withstand stresses and strains similar to structural steel. Since the molding of all the structural units may be carried on under proper conditions, and thorough mixing and seasoning, it is possible to expeditiously erect buildings without any delays incurred by inclement weather and without otherwise being delayed by the accumulation of material.

What I claim is:—

In concrete construction, the combination of a column having longitudinal reinforcing members extending above its upper end, beams having heads abutting each other on said column, said beams having longitudinal reinforcing members therein, the ends of the longitudinal members being formed with sockets adapted to receive the upper ends of the reinforcing members of the column and angle plates spaced from the ends of the beams having one flange embedded in the beam substantially parallel to its longitudinal axis and the other flange extending upward above the surface of the beam, the flanges of the several beams upon the column together forming a socket adapted to receive the lower end of another column seated on said beam ends and connected to the vertical flanges of said angle plates.

In testimony whereof I affix my signature in the presence of two witnesses.

WILLIAM S. PIGGINS.

Witnesses:
ANNA M. DORR,
G. E. McGRANN.